United States Patent
Masuda (10) Patent No.: US 11,235,425 B2
(45) Date of Patent: Feb. 1, 2022

(54) LASER CUTTING PROCESSING METHOD

(71) Applicant: AMADA HOLDINGS CO., LTD., Kanagawa (JP)

(72) Inventor: Kenji Masuda, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 15/516,517

(22) PCT Filed: Oct. 13, 2015

(86) PCT No.: PCT/JP2015/078868
§ 371 (c)(1),
(2) Date: Apr. 3, 2017

(87) PCT Pub. No.: WO2016/063756
PCT Pub. Date: Apr. 28, 2016

(65) Prior Publication Data
US 2018/0236607 A1    Aug. 23, 2018

(30) Foreign Application Priority Data
Oct. 24, 2014 (JP) .............................. JP2014-217409

(51) Int. Cl.
*B23K 26/38* (2014.01)
*G05B 19/4155* (2006.01)
(Continued)

(52) U.S. Cl.
CPC .............. *B23K 26/38* (2013.01); *B23K 26/00* (2013.01); *B23K 26/02* (2013.01); *B23K 26/08* (2013.01);
(Continued)

(58) Field of Classification Search
CPC ....... B23K 26/38; B23K 26/08; G05B 19/416
(Continued)

(56) References Cited

U.S. PATENT DOCUMENTS 5,252,805 A * 10/1993 Nakata ............... B23K 26/0838
219/121.61
5,585,018 A * 12/1996 Kanaoka ............ B23K 26/0626
219/121.61
(Continued)

FOREIGN PATENT DOCUMENTS

JP     04-158995      6/1992
JP     H0751873   *  2/1995   ............. B23K 26/00
(Continued)

OTHER PUBLICATIONS

Machine Translation of JPH0751873; translated Oct. 2018.*
(Continued)

*Primary Examiner* — Tu B Hoang
*Assistant Examiner* — Thomas J Ward
(74) *Attorney, Agent, or Firm* — Greenblum & Bernstein, P.L.C.

(57) ABSTRACT

At a time of carrying out a laser cutting processing in a direction intersecting with a processing line at which the laser cutting processing for a work has been carried out, a laser cutting speed is decelerated before a laser beam reaches the processing line at an initial laser cutting speed, and the laser cutting speed is accelerated when an axial center of the laser beam is positioned within a prescribed range in vicinity of a central position of the processing line, and the laser cutting speed is returned to the initial laser cutting speed, in vicinity of a position at which the axial center of the laser beam crosses the processing line. Also, when the axial center of the laser beam and the central position of the processing line almost coincide, the laser output is made to be almost zero.

8 Claims, 6 Drawing Sheets

(51) Int. Cl.
  *G05B 19/416* (2006.01)
  *B23K 26/00* (2014.01)
  *B23K 26/02* (2014.01)
  *B23K 26/08* (2014.01)
  *B23K 101/18* (2006.01)
(52) U.S. Cl.
  CPC ....... *G05B 19/416* (2013.01); *G05B 19/4155* (2013.01); *B23K 2101/18* (2018.08)
(58) Field of Classification Search
  USPC .......................... 219/121.68, 121.83, 121.84
  See application file for complete search history.

(56) References Cited

U.S. PATENT DOCUMENTS

| | | | |
|---|---|---|---|
| 2006/0102601 | A1 | 5/2006 | Shirk et al. |
| 2007/0170157 | A1 | 7/2007 | Miyajima et al. |
| 2013/0323469 | A1* | 12/2013 | Abramov ............ C03B 33/0222 428/155 |

FOREIGN PATENT DOCUMENTS

| | | |
|---|---|---|
| JP | 2001-334379 | 12/2001 |
| JP | 2002-103067 | 4/2002 |
| JP | 2007-196254 | 8/2007 |
| JP | 2013-220451 | 10/2013 |
| WO | 2012/136262 | 10/2012 |

OTHER PUBLICATIONS

Notification of Reasons for Refusal in JP 2014-217409, with English language translation, dated Dec. 25, 2015.
Decision to Grant Patent in JP 2014-217409, with English language translation, dated Jul. 12, 2016.
Search Report and Written Opinion issued in International Patent Application No. PCT/JP2015/078868, dated Jan. 12, 2016.
Official Communication issued in European Patent Office (EPO) Patent Application No. 15852755.6, dated Jul. 19, 2018.

* cited by examiner

LASER CUTTING PROCESSING METHOD

TECHNICAL FIELD

The present invention relates to a laser cutting processing method, a control device in a laser cutting processing machine, and a programming device, for carrying out a laser cutting processing for a plate shaped work, and in further details, to a laser cutting processing method, a control device in a laser cutting processing machine, and a programming device, capable of carrying out a laser cutting processing excellently even in a case where cutting lines are intersecting, at a time of carrying out a laser cutting processing by arranging a plurality of products on a work adjacently.

BACKGROUND ART

When a laser cutting processing is to be carried out by arranging a plurality of products on a plate shaped work adjacently, the laser cutting processing is carried out with a borderline of each product as a common cutting line (a crosspiece width sharing line) (see Patent Document 1).

Figure 1:
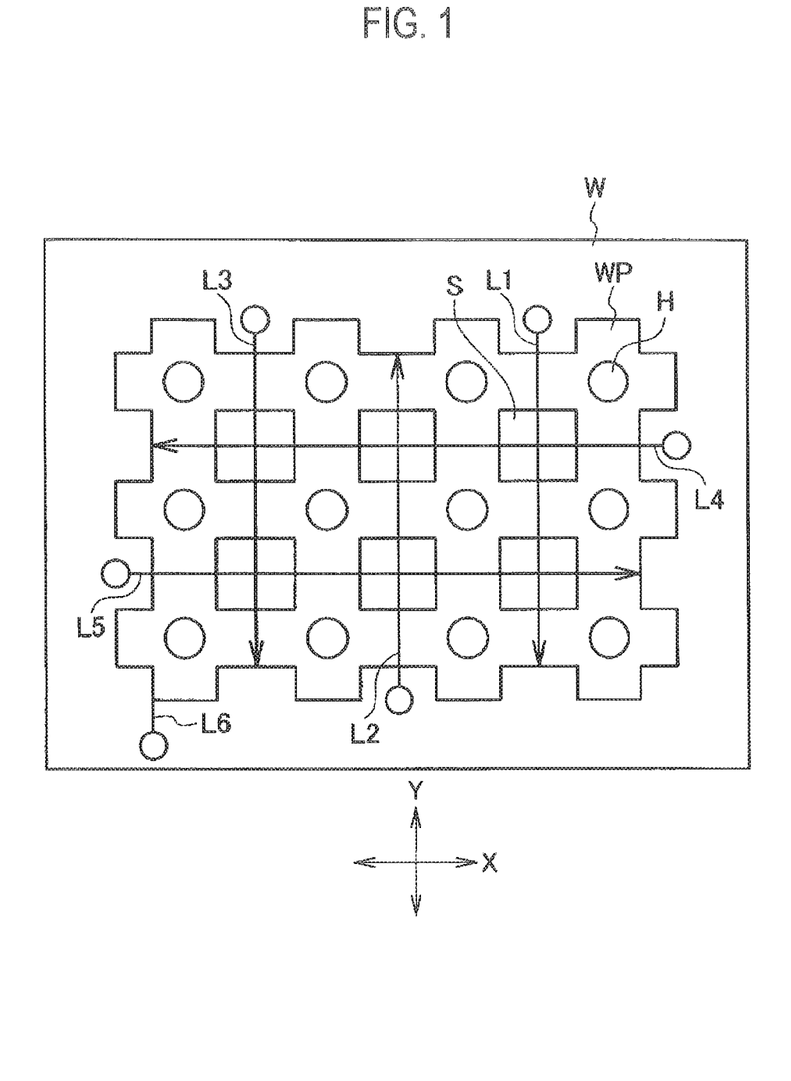
FIG. 1 is a figure for explaining a conventional laser cutting processing method.

In this Patent Document 1, a laser cutting processing method shown in FIG. 1 is described. Namely, as shown in FIG. 1, in this laser cutting processing method, a plurality of products WP, each in a cross shape having a hole H at a central portion, are arranged on a plate shaped work W in plural rows in an X-axis direction and plural lines in a Y-axis direction, and each product WP is cut and separated from the work W by the laser cutting processing.

In that case, first, the laser cutting processing is carried out for each hole H of each product WP and spaces S between products WP, and after that, the cutting of a borderline (a crosspiece width sharing line) of each product WP is carried out. In this cutting of the borderline, the laser cutting processing for lines L1, L2, L3, L4 and L5 is carried out sequentially, and finally the laser cutting processing for an outer circumference is carried out along a line L6.

PRIOR ART DOCUMENTS

Patent Documents

Patent Document 1: Japanese Patent Application Publication No. 2013-220451

SUMMARY OF THE INVENTION

In this laser cutting processing, when the laser cutting processing for the line L6 is to be carried out, the line L6 is going to intersect with a processing line of the line L5 at which the laser cutting processing has already been carried out. Also, the line L6 is going to intersect with a processing finished end of the line L4. In FIG. 1, the line L6 intersects lines L4 and L5 perpendicularly.

As described above, even in the case where the line L6 intersects with the lines L5, L4, there has been no problem of defective processing in the case where a plate thickness of a work is thin (less than or equal to 6.0 mm in soft steel, less than or equal to 3.0 mm in SUS). However, when a work becomes a thick plate (for example, greater than or equal to 9.0 mm in soft steel, greater than or equal to 4.0 mm in SUS), a defective processing occurs at intersecting positions between the line L6 and the lines L5, L4. Similarly, a defective processing occurs also at intersecting positions between the line L6 and the lines L3, L2, L1.

Figure 2:
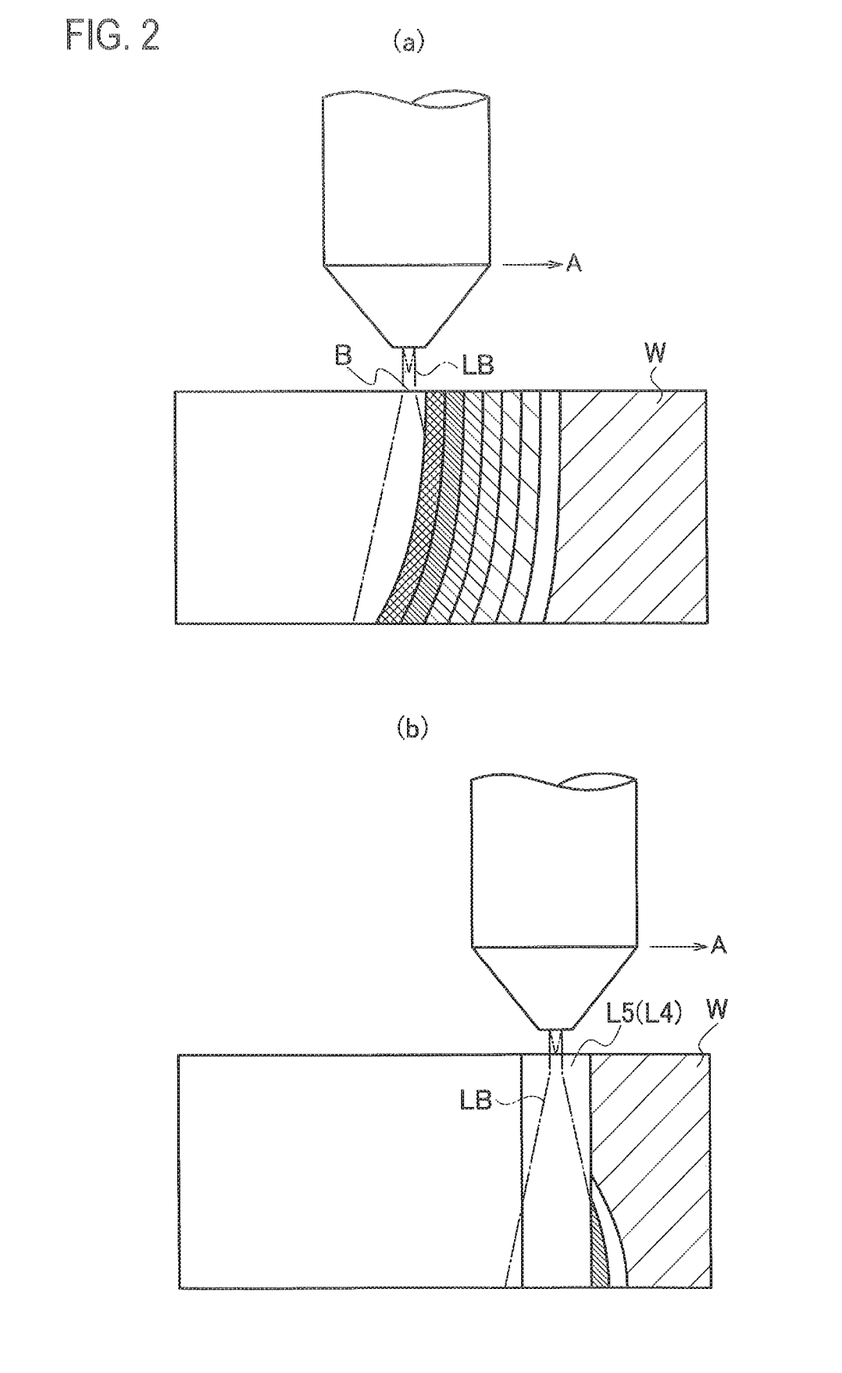
FIG. 2 is a figure for explaining problems in a case where a cutting line of a laser processing intersects with an already processed processing line of a minute width.

Namely, as shown schematically in FIG. 2(a), when the laser cutting processing for a work W of a thick plate is carried out in a direction of an arrow A, a thermal conduction takes place from a laser cutting processing position B to surroundings. Then, a thermal cutting on a lower surface side is carried out with a delay from an upper surface side of the work W.

Here, in the case where the work W is a thick plate, the thermal conduction in a cutting direction (a direction of an arrow A) of the work W is going to take place sufficiently, because a laser cutting processing speed is low speed. In other words, it becomes a mode for carrying out the laser cutting processing while preheating a position at which the laser cutting processing is to be carried out next.

However, as described above, at positions at which the line L6 intersects with the lines L5, L4, as shown in FIG. 2(b), because of the presence of processing lines of a minute width due to the lines L5, L4, the thermal conduction in a direction of the laser cutting processing for the work W is going to be blocked at a time of the laser cutting processing in a direction of an arrow A for the line L6.

Then, when an axial center position of a laser beam LB coincides with a central position in a width direction of said lines L5, L4, a part of the laser beam LB that is enlarged at a lower side than a focal point position is going to reach the lower surface side of the work W and the lower surface side of the work W is going to be melted.

However, as shown in FIG. 2(b) with exaggeration, the upper surface side of the work W is not going to be melted, so that if the laser cutting processing is continued without any change, the laser cutting processing for the upper surface side of the work W would be carried out without any preheating. Because of this, a laser cutting processing condition is different from the case shown in FIG. 2(a), and the upper surface side of the work that is not preheated would be processed immediately, so that it would result in causing a defect in the laser cutting processing.

The present invention has been made in consideration of the above noted situations, and its object is to provide a laser cutting processing method, a control device in a laser cutting processing machine, and a programming device, capable of preventing a defective laser cutting processing, even in a case of carrying out a laser cutting processing in a direction intersecting with a processing line of a minute width at which the laser cutting processing for a work has been carried out, in a processing of a thick plate work.

In order to resolve the above noted problems, the present invention is a laser cutting processing method for a plate shaped work, characterized in that, at a time of carrying out a laser cutting processing in a direction intersecting with a previous laser cut processing line of a minute width, that is, after the laser cutting processing for a work has been carried out, decelerating a laser cutting speed before a laser beam reaches said processing line at an initial laser cutting speed, and accelerating said laser cutting speed when an axial center of said laser beam is positioned within a prescribed range in vicinity of a central position in a width direction of said processing line, and carrying out an acceleration to return said laser cutting speed to said initial laser cutting speed, at a prescribed position before the axial center of said laser beam crosses said processing line, or at a position at which the axial center of said laser beam crosses said processing line, or at a prescribed position after the axial center of said laser beam has crossed said processing line.

Another feature of the present invention is to make a laser output of said laser beam to be zero or a preset minimum output, when the axial center of said laser beam is positioned within said prescribed range in vicinity of the central position in the width direction of said processing line.

Another feature of the present invention is to make said laser cutting speed to be zero or a preset minimum speed, when the axial center of said laser beam is positioned within said prescribed range in vicinity of the central position in the width direction of said processing line.

Another feature of the present invention is to make said laser output larger to a prescribed output within a range smaller than an initial output, when the axial center of said laser beam is positioned within said prescribed range in vicinity of the central position in the width direction of said processing line, while accelerating to a prescribed cutting speed within a range smaller than said initial laser cutting speed, and after the laser cutting processing for a prescribed distance has been carried out at said prescribed output and said prescribed cutting speed, to return said laser output and said laser cutting speed to the initial laser output and the initial laser cutting speed.

Another feature of the present invention is that the prescribed range in vicinity of a center in the width direction of said processing line is a range coinciding with the central position.

Another feature of the present invention is a laser cutting processing method for a plate shaped work that is, at a time of carrying out a laser cutting processing in a direction intersecting with a processing line of a minute width at which the laser cutting processing for a work has been carried out, decelerating a laser cutting speed before a laser beam reaches said processing line, and making the laser cutting speed and a laser output to be zero or preset minimum laser cutting speed and laser output, when the laser beam reached said processing line or when the laser beam passes said processing line.

Another feature of the present invention is a control device for controlling an operation of a laser processing head and an output of a laser oscillator in a laser cutting processing machine, having an intersecting position data memory that stores a position data of a laser cutting processing line intersecting with a processing line of a minute width at which a laser cutting processing has been carried out, and a position data of an intersecting position at which said laser cutting processing line intersects with said processing line, at a time of the laser cutting processing for a plate shaped work; a deceleration start position data memory that stores a position data for starting a deceleration of a laser cutting speed, at a time of carrying out the laser cutting processing at said intersecting position; and a laser processing head operation control means for controlling the operation of said laser processing head and a laser output control means for controlling the output of said laser oscillator, based on the position data stored in said intersecting position data memory and the position data stored in said deceleration start position data memory.

Another feature of the present invention is, in the control device in the laser cutting processing machine, it has a processing program memory that stores a laser cutting processing program for carrying out the laser cutting processing for the work; and an analysis and calculation means for analyzing said laser cutting processing program, and calculating a laser cutting processing line intersecting with a processing line of a minute width at which the laser cutting processing has been carried out and an intersecting position of said processing line and said laser cutting processing line.

Another feature of the present invention is a programming device for providing a processing program with respect to a control device in a laser cutting processing machine, having a processing program memory that stores a laser cutting processing program for carrying out a laser cutting processing for a plate shaped work; an analysis and calculation means for analyzing the laser cutting processing program stored in said processing program memory, and calculating a position data of a laser cutting processing line intersecting with a processing line of a minute width at which the laser cutting processing has been carried out and a position data of an intersecting position at which said laser cutting processing line intersects with said processing line; an intersecting position data memory for storing the position data of said laser cutting processing line and the position data of said intersecting position calculated by said analysis and calculation means; a deceleration start position data memory that stores a position data for starting a deceleration of a laser cutting speed, at a time of carrying out the laser cutting processing at said intersecting position; a control program storing means for storing a control program for controlling an operation of a laser processing head and an output of a laser oscillator in said laser cutting processing machine, based on the position data stored in said intersecting position data memory and the position data stored in said deceleration start position data memory; and an output means for outputting the laser cutting processing program stored in said processing program memory and the control program stored in said control program storing means.

According to the present invention, in the case where the work is a thick plate, at a time of carrying out a laser cutting processing in a direction intersecting with a processing line of a minute width at which the laser cutting processing for a work has been carried out, a laser output and a cutting speed of the laser cutting processing are made to be zero or preset minimum output and minimum cutting speed, when an axial center position of the laser beam is positioned within a prescribed range in vicinity of a central position in a width direction of said processing line.

Consequently, it is capable of preventing a defective laser cutting processing, even in a case of carrying out a laser cutting processing in a direction intersecting with a processing line of a minute width at which the laser cutting processing for a work has been carried out, in a processing of a thick plate work.

DETAILED DESCRIPTION OF THE INVENTION

In the following, embodiments practicing the present invention will be described by using the drawings.

In a laser cutting processing machine (omitted to be shown in figures) according to one embodiment of the present invention, as will be described later, it is made such that a moving operation for relatively moving a laser processing head with respect to a work and an output of a laser oscillator are to be controlled by a control device 1 (see FIG. 4).

Figure 3:
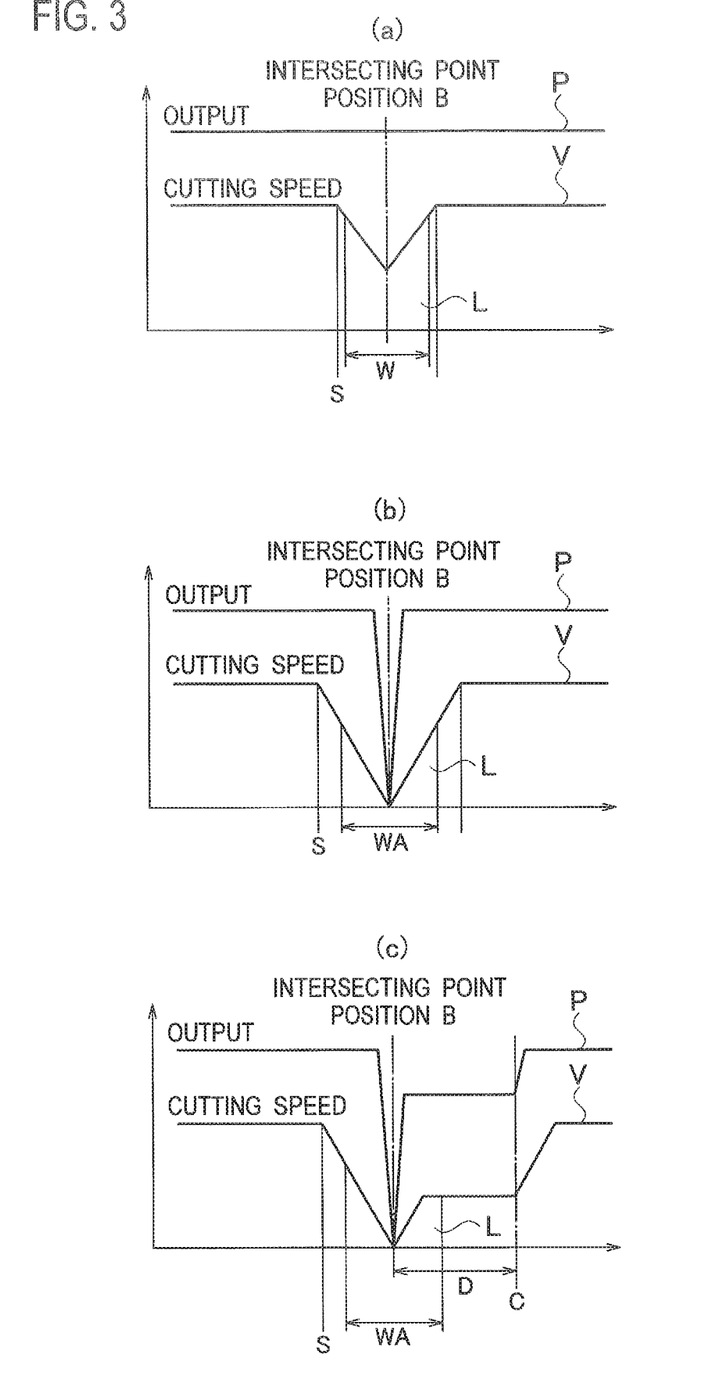
FIG. 3 is a figure for explaining one embodiment of a laser cutting processing method according to the present invention.

In such a laser cutting processing machine, in the case where a plate shaped work is of a soft steel with a small thickness (t=6.1 mm to 10.0 mm) that belongs to thinner ones even for a thick plate, as shown in FIG. 3(a), a laser output P is maintained to be the same output as an output in the conventional case.

Then, a deceleration of a cutting speed V is started by a preset deceleration, such that it becomes an empirically obtained and preset minimum cutting speed, at a position (a deceleration start position) S immediately before reaching a processing line L of a cutting width W at which the laser cutting processing has already been carried out. Then, at an intersecting point position B at which a central position in a width direction of the processing line L and a central position (an axial center position of a laser beam) of a processing line that is being laser cutting processed this time are coinciding, an acceleration is started. Then, when it becomes an initial cutting speed V, that cutting speed V is maintained and the laser cutting processing is continued.

The deceleration start position S is to be determined by the laser output P, the laser cutting speed V, and a material and a plate thickness of the work, and it is to be obtained empirically in advance. Then, the deceleration and acceleration at a time of starting the deceleration at the position S and at a time of starting the acceleration at said intersecting point position B are also to be determined by the laser output P, the laser cutting speed V, and a material and a plate thickness of the work, and they are to be obtained empirically in advance.

Namely, in the case where the plate thickness is a small thickness, the laser output P is maintained to be constant, and the laser cutting speed V is decelerated by the deceleration obtained in advance, at the position S immediately before the laser beam reaches the processing line L at which the laser cutting processing has already been made.

Then, from a vicinity of the intersecting point position B at which the central position in the width direction of the processing line L and the axial center of the laser beam are coinciding, the laser cutting speed V is accelerated by the acceleration obtained in advance, and after the laser cutting speed V reached the initial laser cutting speed, the initial laser cutting speed is maintained and the laser cutting processing is continued. Note that absolute values of the deceleration rate at a time of decelerating and the acceleration rate at a time of accelerating are set to be equal.

This laser cutting processing method is for the case where the plate thickness of the work is a small thickness (t=6.1 mm to 10.0 mm), so that a delay of the laser cutting of a lower surface with respect to an upper surface of the work is going to be small.

Consequently, in the case of carrying out the laser cutting processing that intersects with the processing line L at which the laser cutting processing has been carried out in advance, the conventional problems as described above can be resolved by the laser cutting processing method in which the deceleration is started at said position S immediately before intersecting with the processing line L and the acceleration is started at a vicinity of the intersecting point position B.

Note that the cutting speed acceleration start position is not to be limited to the intersecting position B, and it may suffice to be the cases in which the axial center of the laser beam is positioned within a prescribed range that is preset in vicinity of the intersecting position B.

The laser cutting processing method shown in FIG. 3(b) shows the laser cutting processing method in the case where the work is a soft steel and the plate thickness is a medium thickness (t=10.1 mm to 13.9 mm).

In this laser cutting processing method, the laser output P is maintained to be an identical output as the case shown in FIG. 3(a), or a larger output, and the cutting width WA of the processing line L at which the laser cutting processing has already been carried out is set to be larger than (or equal to) the cutting width W in the case of the work of a small thickness described above, in consideration of a dross ejection property, and also the laser cutting processing is carried out by maintaining the laser cutting speed V to be a lower speed than (or an equal speed to) the case of the laser cutting processing described above.

Then, similarly as described above, the deceleration of the laser cutting speed V is started at the deceleration start position S obtained empirically in advance, and the laser cutting speed V is set to be zero (or a minimum speed obtained empirically in advance) at the intersecting point position B (or within a prescribed range that is preset). In other words, when the deceleration is started from the position S, it is decelerated such that it becomes a speed 0 or a minimum speed obtained empirically in advance, at a vicinity of the intersecting point position B.

Note that when the axial center of the laser beam coincides with the intersecting point position B, or when the axial center of the laser beam is positioned within a prescribed range containing the intersecting point position B, the laser cutting speed V may be controlled to be 0.

As described above, when the laser cutting speed V becomes 0 or a minimum speed obtained empirically in advance at a vicinity of the intersecting point position B, the acceleration is started immediately, and when it is recovered to an original laser cutting speed V, this laser cutting speed V is maintained and the laser cutting processing is continued.

At this point, as shown in FIG. 3(b), the laser output P is set to be 0 or a minimum output obtained empirically in advance, instantaneously for a time that is preset at the intersecting point position B or within a prescribed range that is preset.

Note that the acceleration and deceleration of the laser cutting speed V are sufficiently slow compared with the ON/OFF operation of the laser output P, so that the laser output P may be maintained to be a constant output, without being set to be 0 or a minimum output instantaneously for a time that is preset.

The laser cutting processing method described above is such that the laser cutting speed V is set to be 0 or a minimum speed, and the laser cutting processing is carried out by starting the acceleration immediately, when the central position in the width direction of the processing line L and the axial center of the laser beam are coinciding, or the axial center of the laser beam is positioned within a prescribed range.

Consequently, this laser cutting processing method that intersects with the processing line L for the work becomes a laser cutting processing method that approximates a laser cutting processing method for carrying out the laser cutting processing from an end face of the work, and it is one that can resolve the problem of defective processing as described above.

The laser cutting processing method shown in FIG. 3(c) shows a modified embodiment of the laser cutting processing method shown in FIG. 3(b), although the cutting width WA of the processing line L is the same as the case shown in FIG. 3(b), and it is the laser cutting processing method in the case where the work is a soft steel and the plate thickness is a large thickness (t=14.0 mm or more).

In this laser cutting processing method, the laser output P is maintained to be an identical output as the case described above, or a larger output, and the laser cutting processing is carried out by setting the laser cutting speed V to be a lower speed. In this laser cutting processing method, after the laser output P is set to be zero or a minimum output instantaneously for a time that is preset at the intersecting point position B or within a prescribed range obtained empirically in advance, it is returned to an output (a medium output) of approximately 20% to 80% with respect to an initial output P, and the laser cutting processing is carried out by maintaining the above noted output of approximately 20% to 80% from the intersecting point position B to a preset position C.

As for the cutting speed V in this case, after setting the cutting speed V to be 0 or a lower speed of a preset minimum speed at the intersecting point position B, it is accelerated by a preset acceleration immediately, and in the case where it reached the speed of approximately 10% to 50% of the initial speed, the laser cutting processing is carried out with this cutting speed (a medium speed) of approximately 10% to 50%, and when the position C is reached, it is accelerated to the initial speed by the same acceleration. Then, after passing the position C, the laser cutting processing is continued by the initial output P and the initial laser cutting speed V.

This laser cutting processing method is for the case where the plate thickness of the work is a large thickness, and after the laser output P and the laser cutting speed V are set to be zero or a minimum output and a minimum speed temporarily at a vicinity of the intersecting point position B, the laser output P is recovered to the output of approximately 20% to 80%, while the laser cutting speed V is recovered to the laser cutting speed of approximately 10% to 50%. Then, the laser cutting processing for the work is carried out with the output of approximately 20% to 80% and the laser cutting speed of approximately 10% to 50%, from the intersecting point position B to the position C of a distance D that is obtained empirically in advance and preset.

Consequently, the laser cutting processing for the work is to be carried out after carrying out the preheating of portions in a state where a thermal conduction at a time of the initial laser cutting processing is interrupted by the presence of the processing line L. Thus, it is one that can resolve the conventional problem of defective processing as described above.

Note that the distance D, the medium output of the laser output P, and the medium speed of the laser cutting speed V are obtained empirically in advance based on a material and a plate thickness of the work, the initial laser output P, and the initial laser cutting speed.

In order to carry out the laser cutting processing described above, the control device 1 for controlling a moving operation for relatively moving a laser processing head with respect to a work and an output of a laser oscillator (omitted to be shown in figures) in the laser cutting processing machine (omitted to be shown in figures) is configured as follows.

Figure 4:
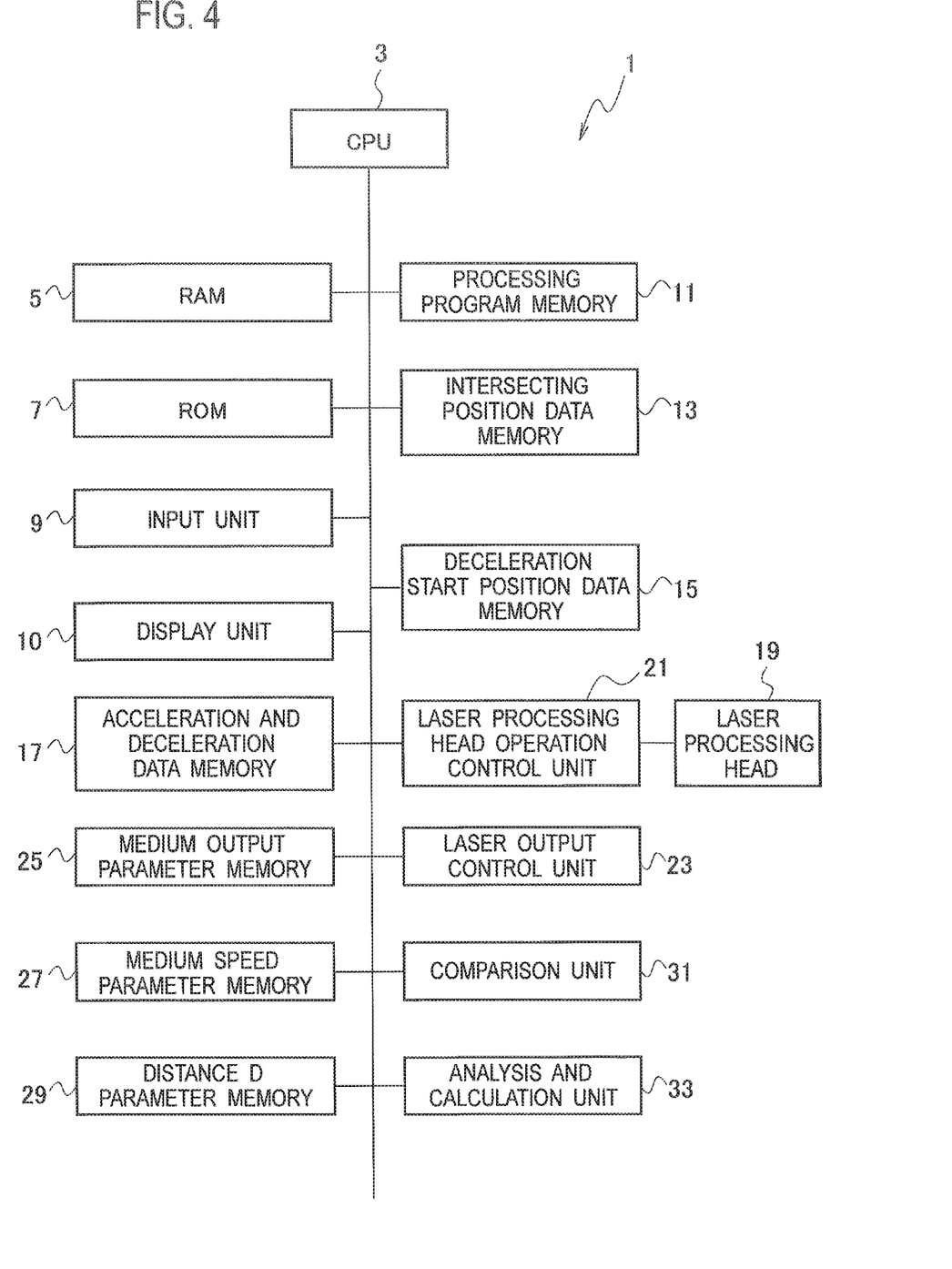
FIG. 4 is a functional block diagram showing a configuration of a control device in a laser cutting processing machine according to one embodiment of the present invention.

Namely, as shown in FIG. 4, the control device 1 is configured from a computer, for example, and equipped with a CPU 3, a RAM 5 and a ROM 7, while it is equipped with an input unit 9 and a display unit 10. Also, the above noted control device 1 is equipped with a processing program memory 11 for storing a processing program for carrying out the laser processing for a plate shaped work (omitted to be shown in figures).

Also, the control device 1 is equipped with an intersecting position data memory 13 that stores a position data of a laser cutting processing line intersecting with the processing line of a minute width at which the laser cutting processing has been carried out, a position data of an intersecting position at which the laser cutting processing line intersects with the processing line, and a position data of a small prescribed range containing the intersecting point position, at a time of carrying out the laser cutting processing according to the processing program stored in the processing program memory 11.

Moreover, the control device 1 is equipped with a deceleration start position data memory 15 that stores a deceleration start position S for starting a deceleration at a time of carrying out the laser cutting processing at the intersecting position stored in the intersecting position data memory 13, which is obtained empirically in advance with a material and a plate thickness of the work, the laser output P, and the laser cutting speed V as parameters.

Also, the control device 1 is equipped with an acceleration and deceleration data memory 17 that stores acceleration and deceleration data for carrying out a deceleration at the position S and for carrying out an acceleration at the intersecting point position B, which are obtained empirically in advance with a material and a plate thickness of the work, the laser output P, and the laser cutting speed V as parameters.

Moreover, the control device 1 is equipped with a laser processing head operation control unit 21 for controlling an operation of a laser processing head 19 in the laser processing machine, at a time of executing the processing program stored in the processing program memory 11, by referring to the data stored in the intersecting position data memory 13, the deceleration start position data memory 15, and the acceleration and deceleration data memory 17.

Also, the control device 1 is equipped with a laser output control unit 23 for controlling an output of a laser oscillator (omitted to be shown in figures) in relation to the operation control for the laser processing head 19, while it is equipped with a medium output parameter memory 25 and a medium speed parameter memory 27 that store a medium output for the laser output and a medium speed for the laser cutting speed that are obtained empirically in advance, based on a material and a plate thickness of the work, the laser output, and the laser cutting speed, at a time of carrying out the laser cutting processing for the work of a large thickness, as parameters.

Also, the control device 1 is equipped with a parameter memory 29 that stores a distance D that is obtained empirically in advance with a material and a plate thickness of the work, the laser output, and the laser cutting speed as parameters, and a comparison unit 31 for carrying out various types of comparison.

In the control device 1 with the above noted configuration, at a time of carrying out the laser cutting processing for the work by executing the processing program stored in the processing program memory 11, the position data stored in the intersecting position data memory 13, the position data stored in the deceleration start position data memory 15, and the data stored in the acceleration and deceleration data memory 17 are referred.

Then, the laser processing head 19 is relatively moved with respect to the work under the control of the laser processing head operation control unit 21, and a moved position data and the position data stored in the deceleration start position data memory 14 are compared by the comparison unit 31. Note that the above noted moved position data is obtained by a rotary encoder or the like that is equipped on a servo motor, for example, for moving the laser processing head 19.

Then, when both of the position data coincide, the relative moving of the laser processing head 19 is decelerated by referring to the deceleration data stored in the acceleration and deceleration data memory 17. Then, when the intersecting point position B or a position within a small prescribed range containing the intersecting point position B coincides with the axial center position of the laser beam, the acceleration of the laser processing head 19 is started. Namely, the laser cutting processing with the operations shown in FIGS. 3(a) and 3(b) is carried out by the control device 1.

In the case where the work is of a large thickness, the laser cutting processing with the operations shown in FIG. 3(c) is carried out by the control device 1, by referring to the medium output, the medium speed and the distance D stored in the medium output parameter memory 25, the medium speed parameter memory 27 and the distance D parameter memory 29 in addition.

Note that the present invention is not to be limited to the embodiments described above, and can be practiced in other forms by making appropriate modifications.

Namely, as another embodiment, as shown in FIG. 4, the control device 1 is equipped with an analysis and calculation unit 33 for storing the laser processing program for carrying out the laser cutting processing for the work in said processing program memory 11, and carrying out an analysis of the laser processing program stored in the processing program memory 11.

The analysis and calculation are carried out by pre-reading the laser processing program with this analysis and calculation unit 33, and various calculation result data calculated by this analysis and calculation unit 33 may be respectively stored in the intersecting position data memory 13, the deceleration start position data memory 15, the acceleration and deceleration data memory 17, the medium output parameter memory 25, the medium speed parameter memory 27, and the distance D parameter memory 29.

Figure 5:
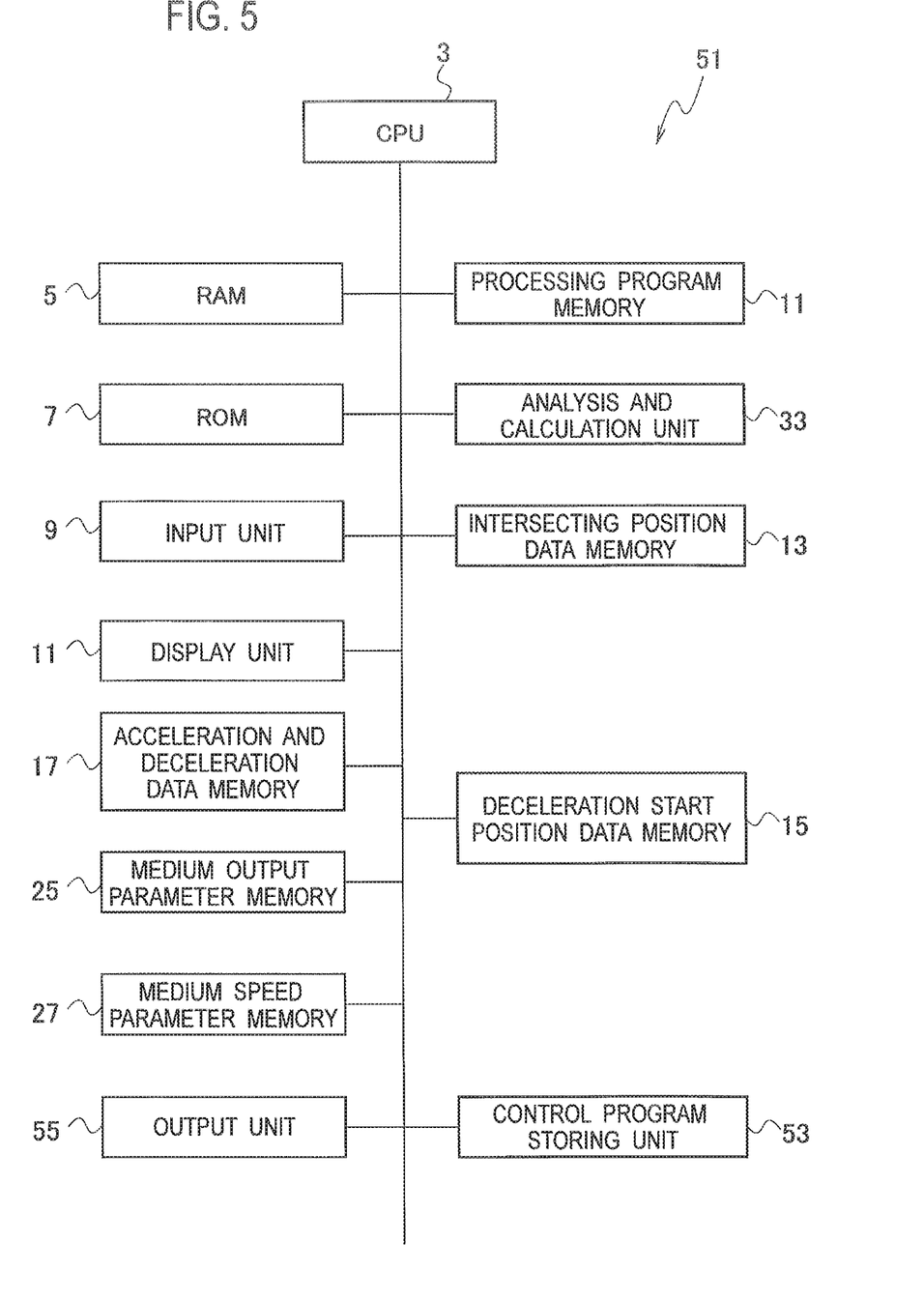
FIG. 5 is a functional block diagram showing a configuration of a programming device in a laser cutting processing machine according to one embodiment of the present invention.

Furthermore, it is also possible to generate the processing program to be provided with respect to the control device 1 by a programming device in a configuration similar to the control device 1. Namely, as shown in FIG. 5, the programming device 51 is configured from a computer, for example, and equipped with a CPU 3, a RAM 5, a ROM 7, an input unit 9, and a display unit 10, similarly as the control device 1. Note that in FIG. 5, constituent elements achieving identical functions are assigned with identical reference numerals.

Also, the programming device 51 is equipped with a processing program memory 11 that stores a laser cutting processing program for carrying out the laser processing for a plate shaped work, and an analysis and calculation unit 33 for analyzing the laser cutting processing program stored in the above noted processing program memory 11, and calculating the position data of the laser cutting processing line that intersects with the processing line after the laser cutting processing has been carried out and the position data of the intersecting position at which the laser cutting processing line intersects with said processing line.

Also, the programming device 51 is equipped with an intersecting position data memory 13 for storing the position data of the laser cutting processing line and the position data of the intersecting position calculated by the analysis and calculation unit 33, and a deceleration start position data memory 15 that stores the position data for starting a deceleration of the laser cutting speed at a time of carrying out the laser cutting processing at the intersecting position.

Moreover, the programming device 51 is equipped with a control program storing unit 53 for storing a control program for controlling an operation of a laser processing head and an output of a laser oscillator in the laser processing machine, based on the position data stored in the intersecting position data memory 13 and the position data stored in the deceleration start position data memory 15, and an output unit 55 for outputting information necessary for executing the processing program, such as the laser cutting processing program stored in the processing program memory 11, the control program stored in the control program storing unit 53, and the data stored in the intersecting position data memory 13 and the deceleration start position data memory 15, etc.

Consequently, the laser cutting processing program and the control program outputted from the output unit 55 can be inputted into the control device 1 via a communication unit and a memory medium, etc., for example.

By the way, in the above described explanation, the laser output is set to be a minimum output while the cutting speed is set to be a minimum cutting speed, at the central position in the width direction of the processing line L at which the laser cutting processing has been carried out on the work in advance or a small prescribed range containing this central position.

Figure 6:
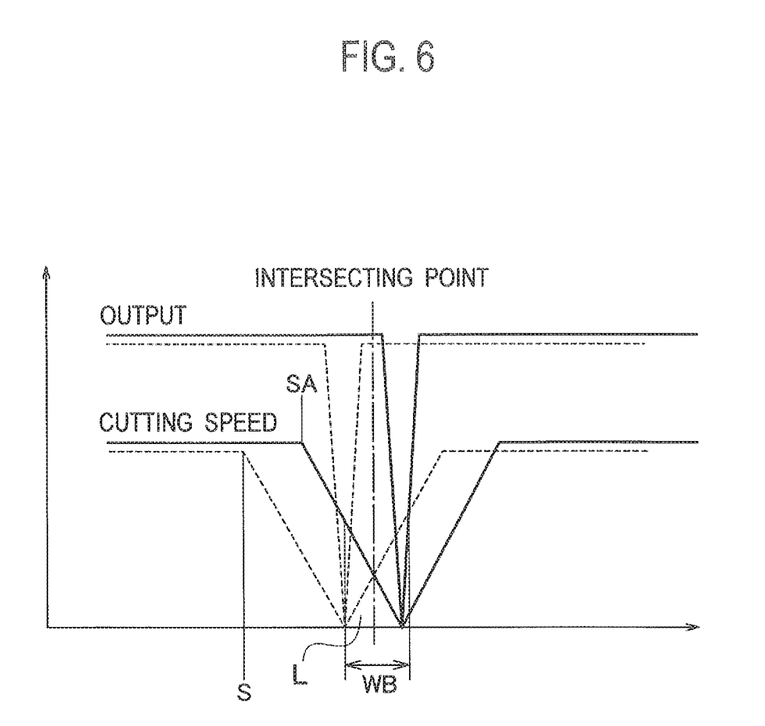
FIG. 6 is a figure for explaining a modified embodiment of a laser cutting processing method according to the present invention.

However, as shown in FIG. 6, it is also possible to set the cutting speed to be 0 or a preset minimum cutting speed while the output of the laser beam is also set to be 0 or a preset minimum output, when the laser beam reached the processing line L as the deceleration is started at the deceleration start position S before the laser beam reaches the processing line L of the cutting width WB.

Also, it is also possible to set the cutting speed to be 0 or a minimum cutting speed while the output of the laser beam is also set to be 0 or a minimum output, at the position immediately before passing the processing line L as the deceleration is started at the deceleration start position SA before reaching the processing line L.

Namely, it is also possible to set the cutting speed to be a minimum cutting speed while the output of the laser beam is set to be a minimum output, when a desired position within the cutting width of the processing line L is reached.

Even in the cases described above, the same effects as the effects described above can be achieved.

By the way, the output control of the laser beam and the speed control of the cutting speed shown in FIG. 3 have been explained by segmenting a small thickness, a medium thickness and a large thickness respectively as the plate thickness. However, the above noted segmentation is merely one example, and it is also possible to control the output of the laser beam and the cutting speed by acquiring in advance the experimental data in finer segmentation, and referring to these experimental data. Namely, it is possible to set the number of segmentation of the plate thickness to be a desired number of segmentation.

UTILIZABILITY IN INDUSTRY

According to the present invention, it is capable of preventing a defective laser cutting processing, even in a case of carrying out a laser cutting processing in a direction intersecting with a processing line of a minute width at which the laser cutting processing for a work has been carried out, in a processing of a thick plate work.

The invention claimed is:

1. A laser cutting processing method for a plate shaped work in order to cut the work and separate a product from the work, the laser cutting processing method comprising:
when a laser cutting processing is performed by crossing a previous laser cut processing line of a minute width for separating the product from the work so as to penetrate a separation of a cutting width from an upper surface to a lower surface of the work, and the previous laser cut processing line is cut and separated perfectly from an upper surface to a lower surface of the work by a laser beam,
decelerating a laser cutting speed before the laser beam reaches the processing line, and accelerating the laser cutting speed by an absolute value of an acceleration rate that is equal to an absolute value of a deceleration rate when an axial center of the laser beam is positioned within a prescribed range in vicinity of a central position in a width direction of the processing line, and
performing an acceleration to return the laser cutting speed to an initial laser cutting speed, at a prescribed position before the axial center of the laser beam crosses the processing line, or at a position at which the axial center of the laser beam crosses the processing line, or at a prescribed position after the axial center of the laser beam has crossed the processing line.

2. In the laser cutting processing method according to claim 1, the laser cutting processing method comprising making a laser output of the laser beam to be zero or a preset minimum output, when the axial center of the laser beam is positioned within the prescribed range in vicinity of the central position in the width direction of the processing line.

3. In the laser cutting processing method according to claim 1, the laser cutting processing method comprising making the laser cutting speed to be zero or a preset minimum speed, when the axial center of the laser beam is positioned within the prescribed range in vicinity of the central position in the width direction of the processing line.

4. In the laser cutting processing method according to claim 2, the laser cutting processing method comprising making the laser output larger to a prescribed output within a range smaller than an initial output after making the laser output to be zero or a preset minimum output, when the axial center of the laser beam is positioned within the prescribed range in vicinity of the central position in the width direction of the processing line, while accelerating to a prescribed cutting speed within a range smaller than the initial laser cutting speed, and after the laser cutting processing for a prescribed distance has been performed at the prescribed output and the prescribed cutting speed, returning the laser output and the laser cutting speed to the initial laser output and the initial laser cutting speed.

5. In the laser cutting processing method according to claim 1, wherein
the prescribed range in vicinity of a center in the width direction of the processing line is a range coinciding with the central position.

6. A laser cutting processing method for a plate shaped work in order to cut the work and separate a product from the work, the laser cutting processing method comprising:
when a laser cutting processing is performed by crossing a previous laser cut processing line of a minute width for separating the product from the work so as to penetrate a separation of a cutting width from an upper surface to lower surface of the work, and the previous laser cut processing line is cut and separated perfectly from an upper surface to a lower surface of the work by a laser beam,
decelerating a laser cutting speed before the laser beam reaches the processing line, and accelerating the laser cutting speed by an absolute value of an acceleration rate that is equal to an absolute value of a deceleration rate when an axial center of the laser beam is positioned within a prescribed range in vicinity of a central position in a width direction of the processing line, and
making the laser cutting speed and a laser output to be zero or preset minimum laser cutting speed and laser output, when the laser beam reached the processing line or when the laser beam passes the processing line.

7. In the laser cutting processing method according to claim 1, wherein
the laser cutting processing in a direction intersecting with a previous laser cut processing line of a minute width comprises laser cutting processing in a direction perpendicularly intersecting with a previous laser cut processing line of a minute width.

8. In the laser cutting processing method according to claim 6, wherein
the laser cutting processing in a direction intersecting with a previous laser cut in the processing line of a minute width comprises laser cutting processing in a direction perpendicularly intersecting with a previous laser cut processing line of a minute width.

\* \* \* \* \*